US012496601B2

(12) United States Patent
Kedzierski

(10) Patent No.: US 12,496,601 B2
(45) Date of Patent: Dec. 16, 2025

(54) DISPENSING DEVICE FOR COMBINING AT LEAST TWO SEPARATE COMPONENTS OF A MULTI-COMPONENT SYSTEM PRIOR TO FIRST USE AND A REPLACEABLE CONTAINER APT TO BE INSTALLED IN SUCH A DISPENSING DEVICE

(71) Applicant: ICB PHARMA SPOLKA JAWNA Tomasz Swietoslawski, Pawel Swietoslawski, Jaworzno (PL)

(72) Inventor: Kacper Kedzierski, Zawiercie (PL)

(73) Assignee: ICB PHARMA SPOLKA JAWNA Tomasz Swietoslawski, Pawel Swietoslawski, Jaworzno (PL)

( * ) Notice: Subject to any disclaimer, the term of this patent is extended or adjusted under 35 U.S.C. 154(b) by 241 days.

(21) Appl. No.: 18/557,942

(22) PCT Filed: Apr. 29, 2021

(86) PCT No.: PCT/PL2021/050030
§ 371 (c)(1),
(2) Date: Oct. 29, 2023

(87) PCT Pub. No.: WO2022/231444
PCT Pub. Date: Nov. 3, 2022

(65) Prior Publication Data
US 2024/0226937 A1 Jul. 11, 2024

(51) Int. Cl.
*B05B 11/00* (2023.01)
*B05B 7/04* (2006.01)

(52) U.S. Cl.
CPC ........ *B05B 11/0081* (2013.01); *B05B 7/0408* (2013.01)

(58) Field of Classification Search
CPC ............... B05B 11/0081; B05B 7/0408; B05B 11/1059; B05B 1/1645; B05B 11/0008; B05B 11/1011
See application file for complete search history.

(56) References Cited

U.S. PATENT DOCUMENTS 3,966,089 A * 6/1976 Klingaman ............... B67B 7/28 222/88
5,421,483 A * 6/1995 Parise ................. B05B 11/0078 222/129
(Continued)

FOREIGN PATENT DOCUMENTS

EP 0 606 672 A1 7/1994
EP 0 888 821 A2 1/1999
(Continued)

OTHER PUBLICATIONS

International Search Report, Application No. PCT/PL2021/050030, mailed Jan. 31, 2022, 3 pages.
(Continued)

*Primary Examiner* — Jesse S Bogue
(74) *Attorney, Agent, or Firm* — Francis J. Maguire; WARE FRESSOLA MAGUIRE & BARBER LLP

(57) ABSTRACT

A dispensing device (1) has first and second containers (2, 3) for storing first and second components before activation and a multi-component after activation and has a dispensing unit (4). An opening (32) of a housing (31) faces the first container (2) and is provided with an openable closure (33) which is closed prior to the first use of the dispensing device (1), and a displaceable activating member (34) is provided within the housing and is kinematically chained with the handle (42), so that displacement of the handle (42) displaces the activating member (34) to an activated position to
(Continued)

permanently displace the openable closure (33) into its open position with the opening (32).

10 Claims, 4 Drawing Sheets

(56) References Cited

U.S. PATENT DOCUMENTS

| | | | | |
|---|---|---|---|---|
| 5,711,457 | A * | 1/1998 | Wanbaugh | B05B 11/1011 222/341 |
| 5,819,987 | A * | 10/1998 | Miller | B05B 11/1081 222/137 |
| 5,957,335 | A | 9/1999 | Otto | |
| 5,964,377 | A * | 10/1999 | Demarest | B05B 11/029 222/145.5 |
| 6,041,969 | A | 3/2000 | Parise | |
| 6,182,865 | B1 | 2/2001 | Bunschoten et al. | |
| 6,290,100 | B1 * | 9/2001 | Yacko | B65D 81/3222 222/510 |
| 8,794,474 | B2 * | 8/2014 | Mueller | B05B 11/0081 215/44 |
| 10,016,772 | B2 | 7/2018 | Bapat et al. | |
| 10,682,658 | B1 * | 6/2020 | Youdovin | B08B 3/026 |
| 2005/0263414 | A1 * | 12/2005 | Harilela | B05B 11/0081 206/219 |
| 2009/0289025 | A1 | 11/2009 | Mueller et al. | |
| 2010/0084430 | A1 | 4/2010 | Sim | |
| 2010/0089947 | A1 | 4/2010 | Sim | |
| 2021/0394213 | A1 | 12/2021 | Corabian | |

FOREIGN PATENT DOCUMENTS

| | | | |
|---|---|---|---|
| EP | 3 650 126 | A2 | 5/2020 |
| WO | 2007/143503 | A2 | 12/2007 |
| WO | 2010/100892 | A1 | 9/2010 |
| WO | 2017/179753 | A1 | 10/2017 |

OTHER PUBLICATIONS

Written Opinion of the International Searching Authority (ISA/EP), Application No. PCT/PL2021/050030, mailed Jan. 31, 2022, 6 pages.

* cited by examiner

DISPENSING DEVICE FOR COMBINING AT LEAST TWO SEPARATE COMPONENTS OF A MULTI-COMPONENT SYSTEM PRIOR TO FIRST USE AND A REPLACEABLE CONTAINER APT TO BE INSTALLED IN SUCH A DISPENSING DEVICE

The invention relates to a dispensing device for combining at least two separate components of a multi-component system prior to first use comprising a first container for storing a first component before activation and the multi-component system after activation, at least one second container for storing at least one second component before activation, and a dispensing unit fixed to the first container and comprising a housing, a nozzle, a displaceable handle attached to the housing and biased in a position distal to the housing by a return spring, a pumping system driven by the handle, that after activation of the dispensing device draws the multi-component system from the first container and dispenses the drawn multi-component system through a nozzle. The invention relates also to a replaceable container apt to be installed in such a dispensing device.

Publication EP3650126 discloses a multifluid dispensing system comprising a receptacle of container in container type and an atomizer. Within the receptacle, between at least two of the component units a connecting system is provided that includes at least some of: at least one residual interface; at least one permanent joint of adhesive or weld type; at least one reinforcing functional form. The connecting system preferably extends on the entire height of the receptacle. The parts of the connecting system are preferably, at least partially, superimposed and contained within an operational section. Additionally, within the receptacle a partitioning-system is provided that consists of at least one mobile sector which develops via delamination from an internal component unit. Within the receptacle is equally provided a compression system that consists of at least one mobile sector which also develops via delamination from an internal component unit. The atomizer is made entirely of plastic, is of multifluid type, and comprises a return spring having two curved arms, and a precompression valve system.

Publication U.S. Pat. No. 8,794,474 discloses a reusable concentrate cartridge adapted to be supported by a diluting and dispensing container for combining at least two separate components of a multi-component system, the concentrate cartridge having a hollow cylindrical element and a hollow tube with a closure portion. The concentrate cartridge is caused to open by the rotating engagement of a closure cap onto the diluting and dispensing container to which causes the closure portion of the hollow tube to disengage, releasing the concentrate material.

Publication U.S. Pat. No. 5,421,483 discloses a container for substances concentrated in the form of powder or a liquid to be placed in solution within a receptacle at the time of use provided in the upper part with an atomizer having a ring nut, which when screwed on the upper mouth of the bottle releases the substance contained in the interior of the container to the solvent which is placed in the interior of the bottle, thus allowing to obtain the desired solution.

Relevant dispensing devices are also disclosed in publications U.S. Pat. No. 6,182,865, WO2017179753, U.S. Pat. No. 10,682,658, US2005263414, EP0888821, US2010084430, U.S. Pat. No. 10,016,772, US2010089947, WO2010100892, or U.S. Pat. No. 5,957,335.

The object of the present invention has been to provide a dispensing device for combining at least two separate components of a multi-component system prior to first use, that would be simple in manufacture and operation, tamperproof and ensure that the entire contents of each of the second containers are released into the first container after activation.

The invention provides a dispensing device, as mentioned in the outset, which is characterized in that said at least one second container comprises a housing having an opening facing said first container and provided with an openable closure which is closed prior to the first use of the dispensing device, and an activating member disposed within said housing, displaceable with respect to said housing, and kinematically chained with the handle, so that displacement of the handle displaces said activating member to an activated position in which said activating member displaces said openable closure into its open position with said opening.

The term “return spring” as used in the context of the present invention denotes any component capable of elastic deformation that tends to maintain its equilibrium position due to an entropic force.

Preferably said openable closure has a form of a cap snap-fitted, press-fitted, or shrink-fitted on said opening of said housing of said second container(s).

Preferably said dispensing unit further comprises at least one releasing member linked with the housing and with the handle and configured to displace said activating member to said activated position.

In this case preferably said at least one releasing member is said return spring of said handle that elastically deflects upon the handle movement and displaces the activating member to said activated position with its deflected section, preferably with its deformed curved arm section.

Preferably said activating member has a form of an internal chamber disposed, preferably slidably, within said housing of said at least one second container.

Preferably the dispensing device further comprises a tamperproof assembly blocking displacement of the handle prior to first use.

Preferably said tamperproof assembly has a form of a locking lever pivotably attached to the housing and made as a single element with a tamperproof detachable clip.

The invention provides also a replaceable container for storing a component of a multi-component system prior to first use, apt to be installed in a dispensing device, as mentioned in the outset, which is characterized in that it comprises a housing having an opening facing said first container after installation and provided with an openable closure which is closed prior to the first use of said replaceable container, and an activating member disposed within said housing, displaceable with respect to said housing, and apt to be kinematically chained with the handle, so that displacement of the handle displaces said activating member to an activated position in which said activating member displaces said openable closure into its open position with said opening.

Preferably said openable closure has a form of a cap snap-fitted, press-fitted, or shrink-fitted on said opening of said housing of said replaceable container.

Preferably said activating member has a form of an internal chamber disposed, preferably slidably, within said housing of said replaceable container.

The invention has been presented below in exemplary embodiments and in reference to the drawings, in which:

FIG. 1 shows an embodiment of a dispensing device before activation in cross-sectional view;

FIG. 2 schematically illustrates the dispensing device shown in FIG. 1 in the front view;

Figure 6A:
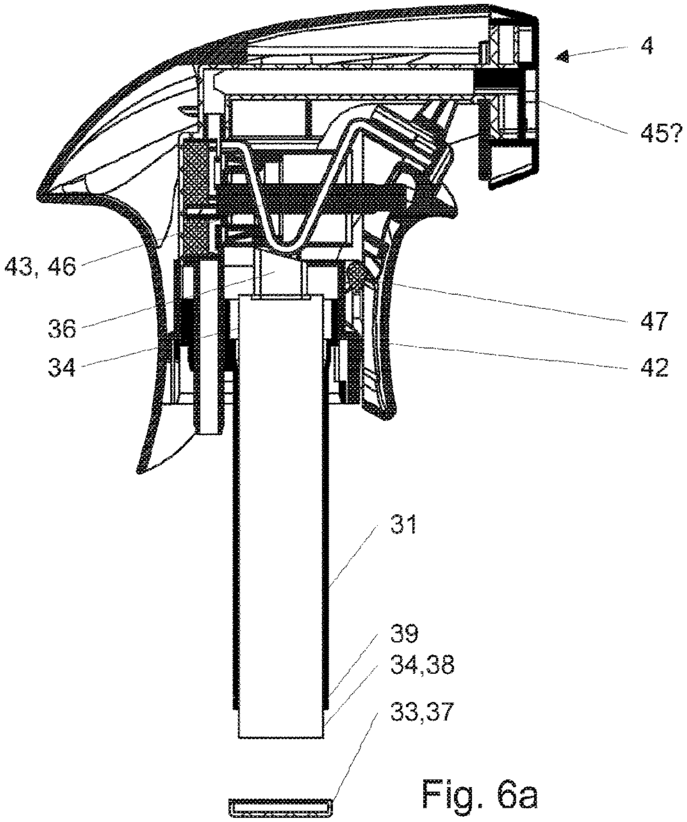
FIG. 6 shows a dispensing unit after activation in cross-sectional (FIG. 6*a*) and axonometric (FIG. 6*b*) view.
Figure 6B:
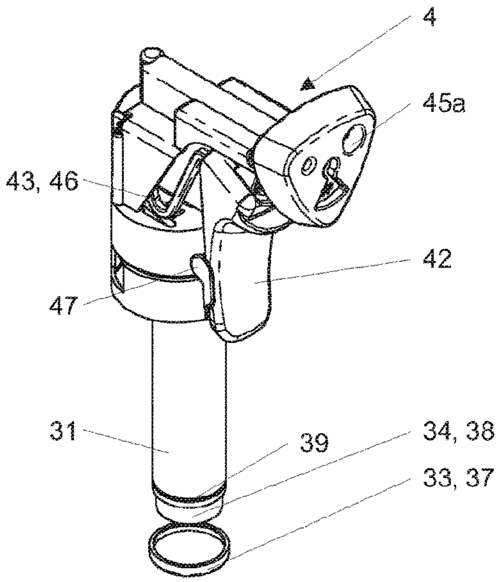
Figure 7A:
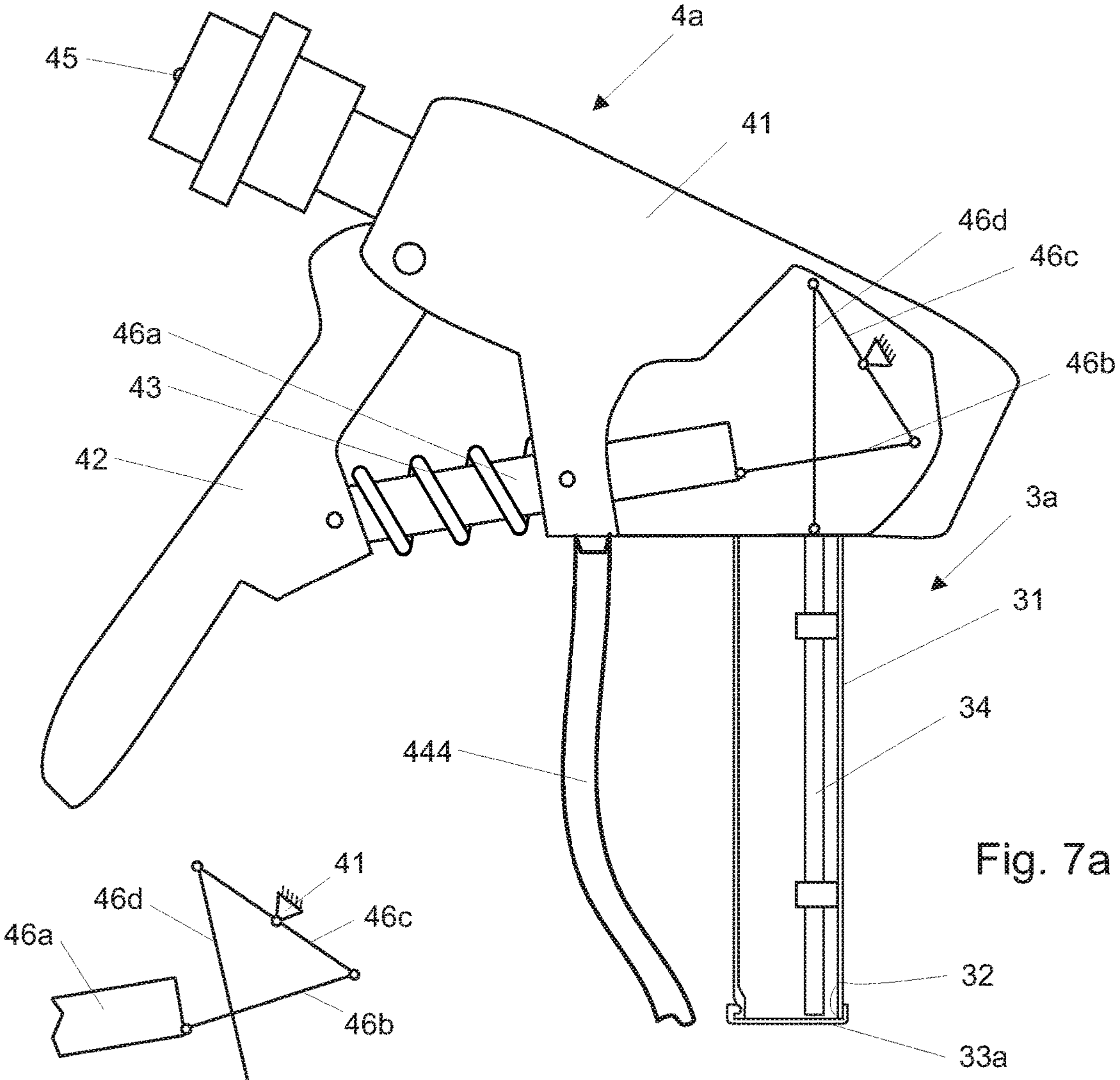
Figure 7B:
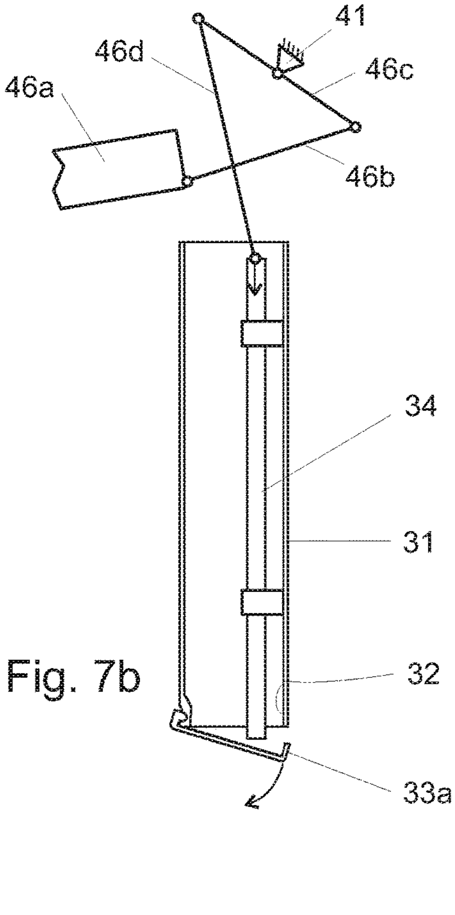
Figure 8:
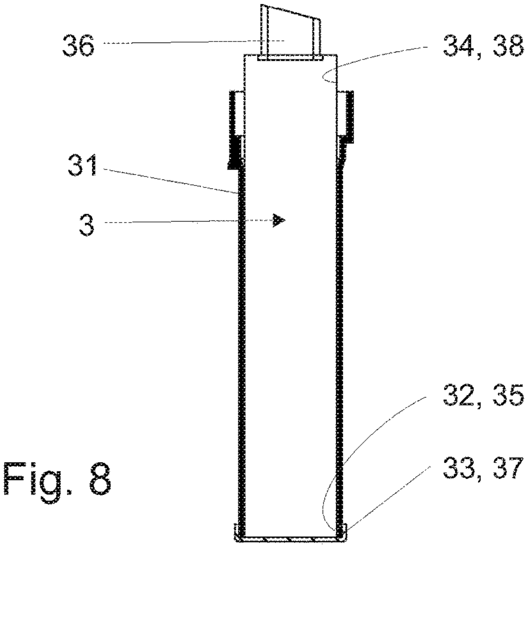

FIG. 7 schematically illustrates another embodiment of a dispensing unit of a dispensing device before activation (FIG. 7*a*) and after activation (FIG. 7*b*); and FIG. 8 schematically illustrates a replaceable container, apt to be installed in the dispensing device shown in FIGS. 1-6.

Numerical references to the same functional elements are the same throughout the drawings. Where appropriate, they are supplemented with additional suffixes (a, b, . . . ) to differentiate elements of the same functionality but different construction.

Figure 1:
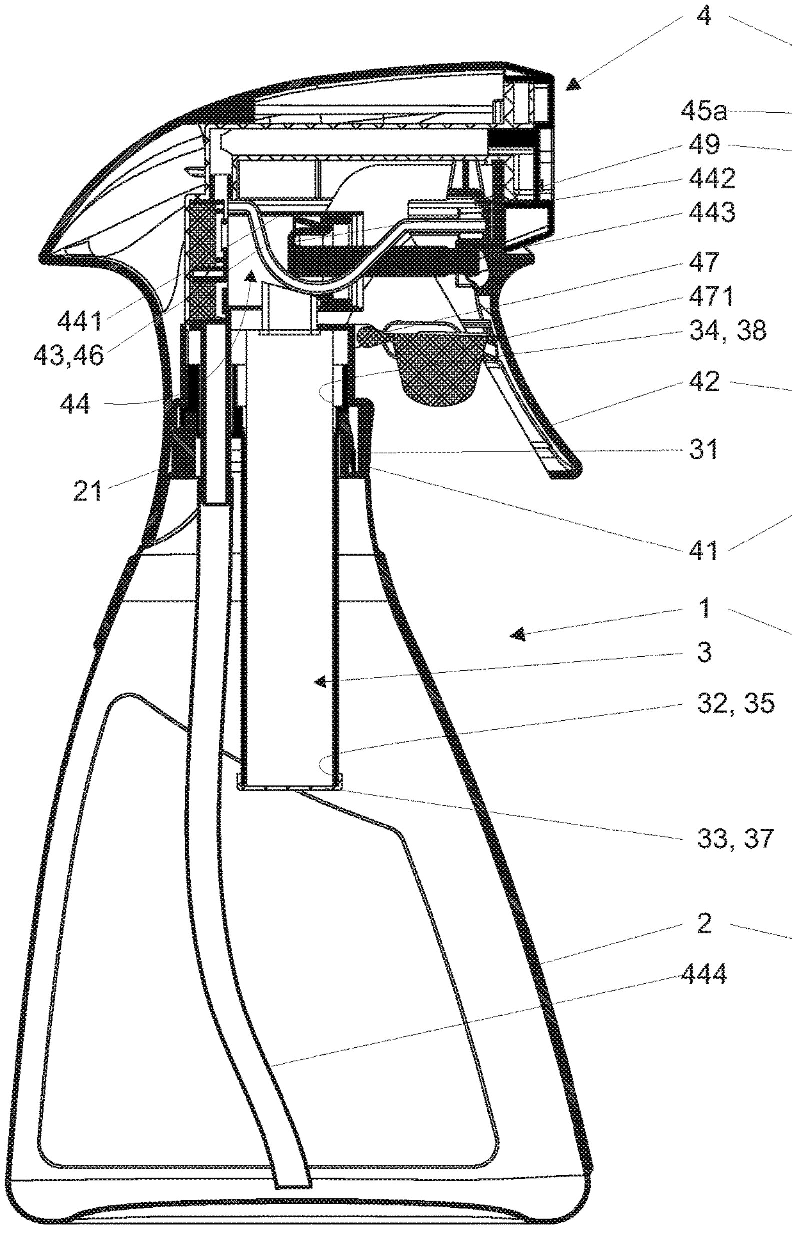
Figure 2:
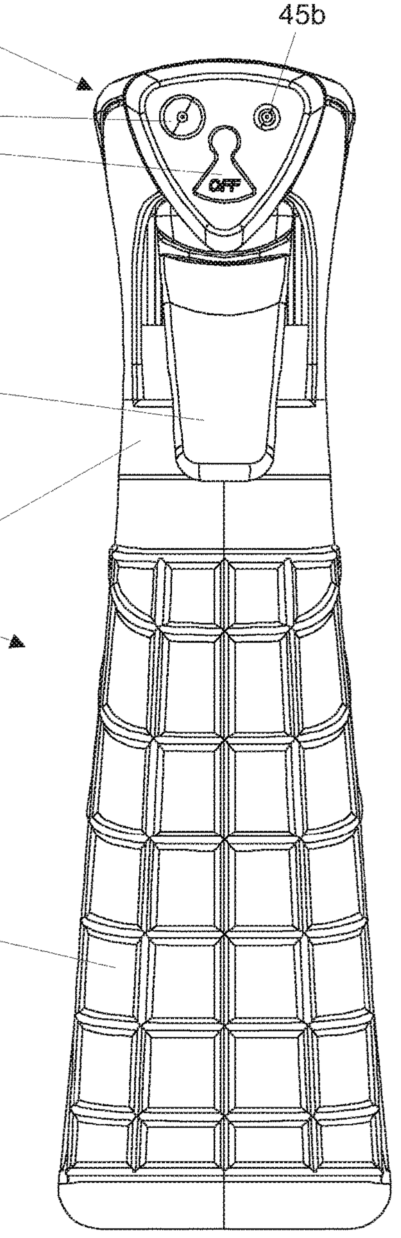
Figure 3A:
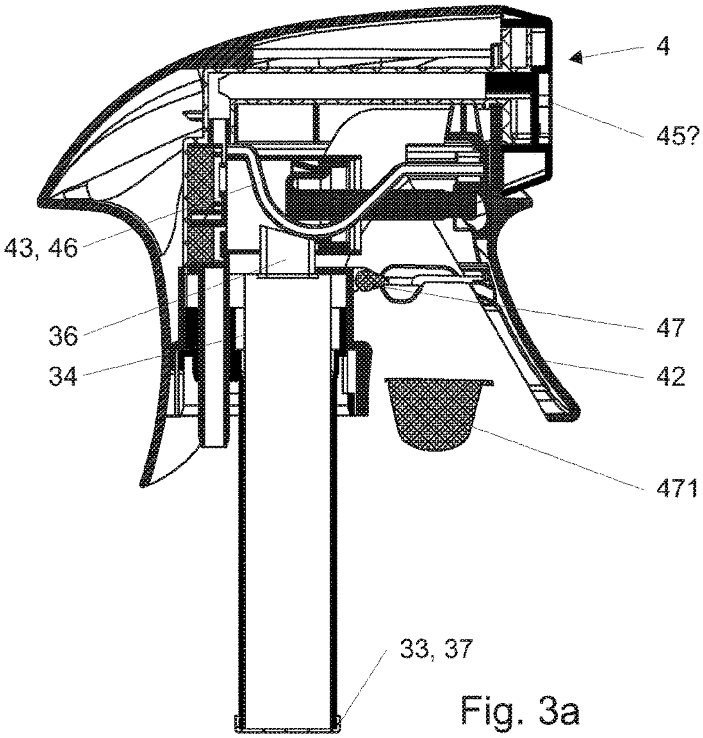
FIG. 3 shows a dispensing unit of the dispensing device during a first step of the activation process in cross-sectional (FIG. 3*a*) and axonometric (FIG. 3*b*) view.
Figure 3B:
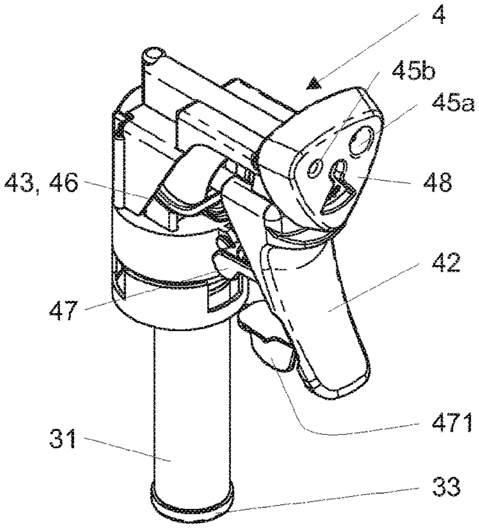
Figure 4A:
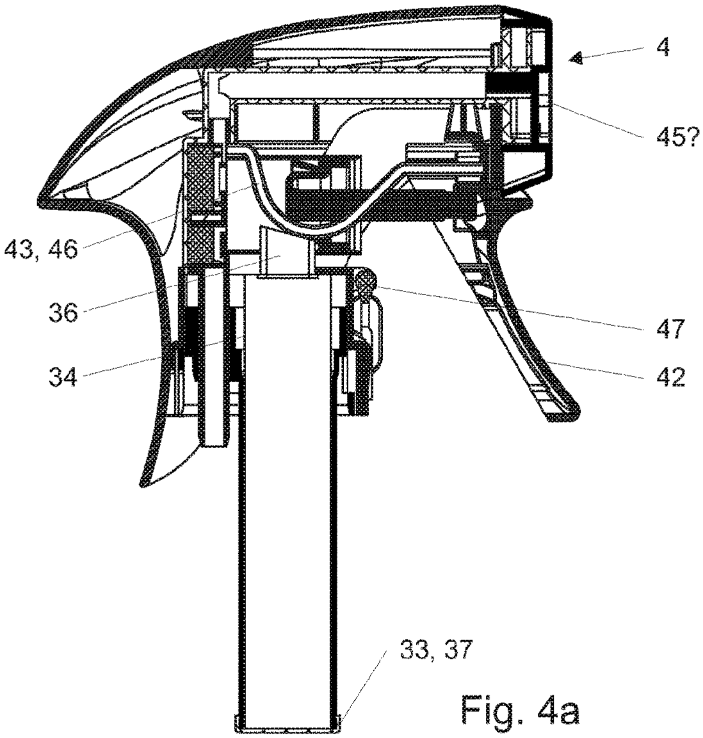
FIG. 4 shows a dispensing unit during a second step of the activation process in cross-sectional (FIG. 4*a*) and axonometric (FIG. 4*b*) view.
Figure 4B:
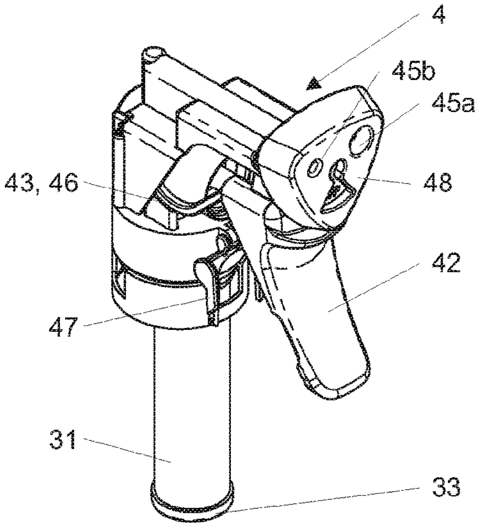
Figure 5A:
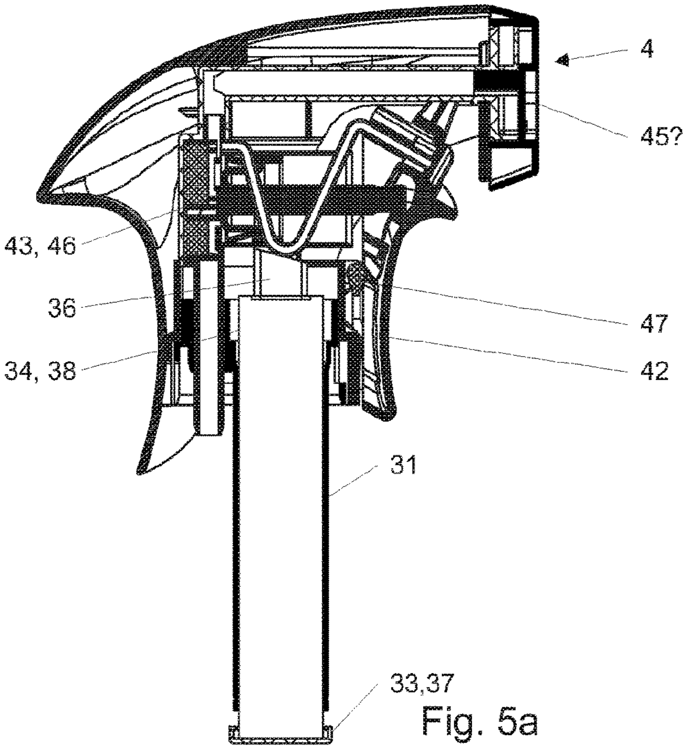
FIG. 5 shows a dispensing unit during a third step of the activation process in cross-sectional (FIG. 5*a*) and axonometric (FIG. 5*b*) view.
Figure 5B:
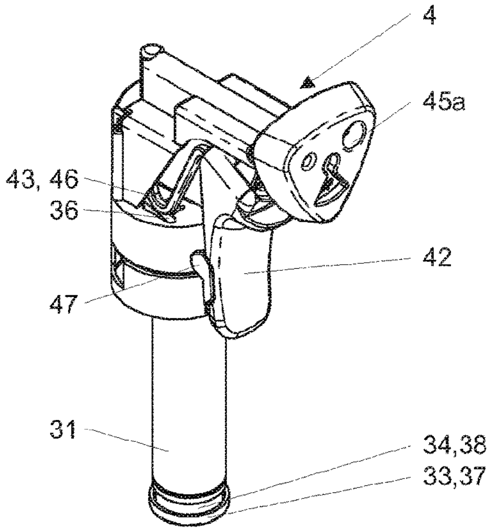

A dispensing device 1 for combining two separate components of a two-component system prior to first use, shown in FIG. 1 and FIG. 2 before activation, comprises a first container 2, a second container 3 and a dispensing unit 4. The first container 2 is used for storing a first component before activation and the multi-component system after activation, while the second container 3 is used for storing a second component before activation.

The first container 2 is provided with an opening 21, and the dispensing unit 4 comprises a housing 41 fixed on the opening 21 of the first container 2. The second container 3, illustrated also in FIG. 8, is press-fitted to the dispensing unit 4 and disposed within the first container 2.

The dispensing unit 4 further comprises a nozzle 45, a displaceable handle 42, which in this embodiment is pivotably attached to the housing 41 and biased in a position distal to the housing 41 by a return spring 43. The handle 42 is connected with a typical pumping system 44, which in this embodiment comprises a chamber 441, a piston 442 slidably disposed within the chamber 441 and having a piston rod 443 connected with the handle 42, and two non-return valve arrangements (not shown in the drawings) the first one installed between a dispensing pipe 444 and the chamber 441 and the second one installed between the chamber 441 and the nozzle 45, respectively, enabling only one-directional flow of multi-component system from the first container 2 through the chamber 441 to the nozzle 45 after the activation of the dispensing device 1.

The second container 3 comprises a housing 31 having a housing opening 32 at its end distal to the dispensing unit 4. Before activation of the dispensing device 1 the housing opening 32 is closed by an openable closure 33 in a form of a cap 37 snap-fitted in a snap-fit groove 39 (cf. FIG. 6) of the housing 31.

The second container 3 further comprises a moveable activating member 34 that in this embodiment has a form of an internal chamber 38 slidably disposed within the housing 31 of the second container 3 and having an opening 35 substantially aligned with the housing opening 32.

The dispensing unit 4 further comprises a locking lever 47 pivotably attached to the housing 41 and having an axis of rotation substantially parallel to the axis of rotation of the handle 42. In a position shown in FIG. 1, the locking lever 47 remains in an extended position and its end distal to its axis of rotation is snapped in the handle 42, therefore blocking rotation of the handle 42. The locking lever 47 is made as a single element with a tamperproof detachable clip 471 so that before activation of the dispensing device 1 it cannot be rotated to a position adjoining the housing 41 and the handle 42 remains locked.

The process of activation of the dispensing device 1 is illustrated in FIGS. 3-6. In the first step, shown in FIG. 3, the tamperproof detachable clip 471 is removed from the locking lever 47. In the second step, shown in FIG. 4, the locking lever 47 is rotated to a position adjoining the housing 41 unlocking rotation of the handle 42. In the third step, shown in FIG. 5, the handle 42 is squeezed towards the housing 41. Thanks to that also a releasing member 46, that in this embodiment is V-shaped and performs a function of the return spring 43, is squeezed. Deflected releasing member 46 presses an activating protrusion 36 of the internal chamber 38 of the second container 3 forcing it to slide down from the housing 31 along with the cap 37. As shown in FIG. 6 the cap 37, which is no longer supported by the housing 31 drops down, releasing the whole content of the second component of the two-component system to the first container 2.

After the second component is mixed with the first component in the first container 2 the dispensing device 1 is ready to be used. To this end manually forced rotation of the handle 42 pushes the piston 442 into the chamber 441 what results in feeding the multi-component system drawn into the chamber 441 to the nozzle 45 through the second non-return valve arrangement (not shown in the drawings). Rotation of the handle 42 away from the first container 2, forced by the return spring 43, draws the piston 442 back in the chamber 441 what results in drawing the multi-component system from the first container 2 through the dispensing pipe 444 and the first non-return valve arrangement to the chamber 441. Thus a reciprocating movement of the handle 42 results in a sequential drawing of the multi-component system from the first container 2 to the chamber 441 and then dispensing the drawn multi-component system through a nozzle 45.

In this embodiment the dispensing device 1 comprises two nozzles 45*a* and 45*b* formed in a triangular shaped nozzle selector 48 fixed rotationally to the housing 41. Wide nozzle 45*a* serves to dispense more disperse spray of the multi-component system over relatively short distance, while narrow nozzle 45*b* serves to dispense more focused spray over relatively long distance. The nozzle selector 48 further comprises a blocking cap 49.

Should a need arise (in the case of child protection for example) the locking lever 47 can be rotated back to the extended position with its end distal to its axis of rotation snapped within the handle 42 and blocking its rotation.

Another embodiment of a dispensing unit is schematically illustrated in FIG. 7. A handle 42 is connected to a kinematic chain formed by a first releasing member 46*a* linked with the handle 42 and with a second releasing member 46*b*, linked with a third releasing member 46*c*, pivotably supported within the housing 41 and linked with a fourth releasing member 46*d*, that is ultimately linked with an activating member 34. Thus, movement of the handle 42 is transferred by the rigid releasing members 46*a*-46*d* to the activating member 34 in a form of a rod, slidably disposed within a housing 31 of a second container 3, forcing it to slide down and displacing an openable closure 33 of the housing 31 into its open position with an opening 32 of the housing 31, as shown in FIG. 7*b*. In this embodiment the openable closure 33*a* is pivotably attached to the housing 31 at the opening 32 and before activation is press fitted with the housing 31.

As shown in FIG. 8 a second container 3 can have a form of a replaceable container that can be press-fitted (alternatively snap-fitted or screwed) inside a dispensing unit 4 or a first container 2 of the dispensing device 1. This enables to use the same dispensing device 1 many times, thus reducing plastic pollution. This can be advantageous for example, in a case if a first component of a multi-component system is a simple solvent, such as water, that is commonly available, and only a second component(s) is a complex chemical solute that needs to be produced in a factory.

A skilled technician will appreciate that the dispensing device according to the present invention can have more than one second container 3, those second containers 3 can be provided with the same or distinct openable closure(s) 33 displaceable by the same or distinct activating member(s) 34. A skilled technician will also appreciate an embodiment in which an activating member 34 is disposed within a housing 31 and displaceable with respect to the housing 31, wherein the housing is displaced to the activated position due to the handle 42 displacement.

The above embodiments of the present invention are therefore merely exemplary. The figures are not necessarily to scale and some features may be exaggerated or minimized. These and other factors however should not be considered as limiting the spirit of the invention, the intended scope of protection of which is indicated in appended claims.

LIST OF REFERENCE NUMERALS

- 1. dispensing device
- 2. first (dispensing) container
  - 21. opening
- 3. second (storage) container
  - 31. housing
  - 32. housing opening
  - 33. openable closure
  - 34. activating member
  - 35. internal chamber opening
  - 36. activating protrusion
  - 37. cap
  - 38. internal chamber
  - 39. snap-fit groove
- 4. dispensing unit
  - 41. housing
  - 42. handle
  - 43. return spring
  - 44. pumping system
    - 441. chamber
    - 442. piston
    - 443. piston rod
    - 444. dispensing pipe
  - 45. nozzle
  - 46. releasing member
  - 47. locking lever
    - 471. tamperproof detachable clip
  - 48. nozzle selector
  - 49. blocking cap

The invention claimed is:

1. A dispensing device (1) for combining at least two separate components of a multi-component system prior to first use comprising a first container (2) for storing a first component before activation and the multi-component system after activation, at least one second container (3) for storing at least one second component before activation, and a dispensing unit (4) fixed to the first container (2) and comprising a housing (41), a nozzle (45), a displaceable handle (42) attached to the housing (41) and biased in a position distal to the housing (41) by a return spring (43), a pumping system (44) driven by the handle (42), that after activation of the dispensing device (1) draws the multi-component system from the first container (2) and dispenses the drawn multi-component system through the nozzle (45), characterized in that said at least one second container (3) comprises a housing (31) having an opening (32) facing said first container (2) and provided with an openable closure (33) which is closed prior to the first use of the dispensing device (1), and an activating member (34) disposed within said housing (31), displaceable with respect to said housing (31), and kinematically chained with the handle (42), so that displacement of the handle (42) displaces said activating member (34) to an activated position in which said activating member (34) displaces said openable closure (33) into its open position with said opening (32).

2. The dispensing device (1) according to claim 1, characterized in that said openable closure (33) has a form of a (37) cap snap-fitted, press-fitted, or shrink-fitted on said opening (32) of said housing (31) of said second container(s) (3).

3. The dispensing device (1) according to claim 1, characterized in that said dispensing unit (4) further comprises at least one releasing member (46) linked with the housing (41) and with the handle (42) and configured to displace said activating member (34) to said activated position.

4. The dispensing device (1) according to claim 3, characterized in that said at least one releasing member (46) is said return spring (43) of said handle (42) that elastically deflects upon the handle (42) movement and displaces the activating member (34) to said activated position with its deflected section, preferably with its deformed curved arm section.

5. The dispensing device (1) according to claim 1, characterized in that said activating member (34) has a form of an internal chamber (38) disposed, preferably slidably, within said housing (31) of said at least one second container (3).

6. The dispensing device (1) according to claim 1, characterized in that it further comprises a tamperproof assembly (47, 471) blocking displacement of the handle (42) prior to first use.

7. The dispensing device (1) according to claim 6, characterized in that said tamperproof assembly (47, 471) has a form of a locking lever (47) pivotably attached to the housing (41) and made as a single element with a tamperproof detachable clip (471).

8. A replaceable container (3) for storing a component of a multi-component system prior to first use, apt to be installed in a dispensing device (1) for combining at least two separate components of a multi-component system prior to first use that comprises a first container (2) for storing a first component before activation and the multi-component system after activation, and a dispensing unit (4) fixed to the first container (2) and comprising a housing (41), a nozzle (45), a displaceable handle (42) attached to the housing (41) and biased in a position distal to the housing (41) by a return spring (43), a pumping system (44) driven by the handle (42), that after activation of the dispensing device (1) draws the multi-component system from the first container (2) and dispenses the drawn multi-component system through the nozzle (45), characterized in that it comprises a housing (31) having an opening (32) facing said first container (2) after installation and provided with an openable closure (33) which is closed prior to the first use of said replaceable container (3), and an activating member (34) disposed within said housing (31), displaceable with respect to said housing (31), and apt to be kinematically chained with the handle (42), so that displacement of the handle (42) displaces said activating member (34) to an activated position in which said activating member (34)

displaces said openable closure (33) into its open position with said opening (32).

9. The replaceable container (3) according to claim 8, characterized in that said openable closure (33) has a form of a (37) cap snap-fitted, press-fitted, or shrink-fitted on said opening (32) of said housing (31) of said replaceable container (3).

10. The replaceable container (3) according to claim 8, characterized in that said activating member (34) has a form of an internal chamber (38) disposed, preferably slidably, within said housing (31) of said replaceable container (3).

* * * * *